United States Patent
Jozwiak et al.

(10) Patent No.: US 6,795,285 B1
(45) Date of Patent: Sep. 21, 2004

(54) PROTECTIVE ELECTRICAL CIRCUIT

(75) Inventors: Todd Michael Jozwiak, Benton Harbor, MI (US); David Wayne Mundy, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 70 days.

(21) Appl. No.: 10/248,795

(22) Filed: Feb. 19, 2003

(51) Int. Cl.[7] .............................................. H02H 3/16
(52) U.S. Cl. ...................................................... 361/45
(58) Field of Search ............................. 361/42, 45, 49, 361/115

(56) References Cited

U.S. PATENT DOCUMENTS 5,654,857 A * 8/1997 Gershen ....................... 361/42
5,661,623 A * 8/1997 McDonald et al. ........... 361/42

* cited by examiner

*Primary Examiner*—Gregory J. Toatley, Jr.
*Assistant Examiner*—Boris Benenson
(74) *Attorney, Agent, or Firm*—John F. Colligan; Robert O Rice; Stephen Krefman

(57) ABSTRACT

An appliance is protected against ground faults by a ground fault interrupter (GFI) that sends a signal to an AND gate between the GFI and a controlling microprocessor on one side and a load relay for operating a load device in the appliance on the other side. The GFI signals a ground fault directly to the load relay causing it to deactivate the load device. The appliance is also protected against reverse polarity by a flow detector circuit that signals the load relay to deactivate the load device in a reverse polarity condition.

19 Claims, 3 Drawing Sheets

PROTECTIVE ELECTRICAL CIRCUIT

BACKGROUND OF INVENTION

1. Field of the Invention

The invention relates to protection against current leakage to ground, particularly in electrical devices such as appliances. In another aspect, the invention relates to detecting reverse polarity in electrical devices.

2. Description of the Related Art

In electrical load devices supplied through conductors from a power source there is a particular failure mode known as a ground fault where current flows between one of the "hot" conductors and ground. A typical cause of such a fault is where water or moisture comes into contact with the electrical circuit. One common solution to the problems posed by ground faults is the use of shields. Typically, plastic shields are used to route water or moisture away from the electrical circuit, whether the device is a hand-held appliance such as a hair dryer or a stand-alone appliance such as a dishwasher. But the use of plastic shields often leads to other problems. For example, shields may complicate assembly and service of a device, leading to increased leaks and loose wires. Some shields may themselves present fire hazards, requiring the addition of fire retardant materials to the device. Material and labor costs associated with testing shielded devices may render the devices too costly to be competitive. Moreover, shields will protect against only leakage they have been designed for. Other changes in device design or usage can alter the path moisture may take to an electrical component.

Whereas shields attempt to protect against ground faults by preventing the conditions that would lead to a failure, various devices known as ground fault interrupters (GFI's) offer protection regardless of the conditions leading to the failure. A GFI senses any minute leakage current flowing within a load device from a line "hot" conductor to ground. When such leakage current is sensed, current to the load device is immediately interrupted, thereby avoiding a shock hazard. A power relay unique to the GFI typically does the actual interrupting. The specific way in which a ground fault condition is usually sensed is by employing a differential current transformer to detect a current imbalance in the power input lines. If the current flowing into the load does not exactly equal the current flowing out of the load, then it is presumed that some of the current is diverting to ground.

A GFI typically uses its own relay to interrupt or open the circuit supplying the load. The contacts for the relay itself, however, are normally closed, which leaves open the possibility that the GFI may receive a current that welds the contacts closed under certain conditions, such as an electrical storm. When this condition occurs, the GFI becomes non-functional, because the welding prevents the relay from disconnecting the power source when a fault would otherwise have been detected. Household circuits protected by a GFI that deliver current to an electrical device normally have test buttons to determine whether the GFI is functional or not. But many electrical devices are not connected to GFI protected household circuits. And even if they have built-in GFI protection, they normally lack any way of determining the functionality of the GFI, because the GFI operates on a separate circuit independent of the load circuit.

SUMMARY OF INVENTION

The problems noted in the prior art are solved by the present invention of incorporating a GFI into the load circuit of the electrical load device. A protective circuit according to the invention is adapted for an electrical load device operable from first and second conductors connected to a power source by way of a relay. The relay is operable from a control means, preferably a microprocessor. In the protective circuit, a ground fault interrupter capable of sensing any imbalance in current flowing through the first and second conductors and generating a signal indicative of that imbalance, sends such a signal directly to the load relay so that the relay deactivates the electrical load device upon receipt of the signal.

In one aspect of the invention, the control means monitors the signal from the ground fault interrupter and deactivates itself when a signal indicative of current imbalance is received. Also, an AND gate can be provided between the ground fault interrupter and the relay and between the control means and the relay, wherein the AND gate must receive signals from both the ground fault interrupter and the control means for the relay to be activated. Any break in signal from either the ground fault interrupter or the control means will deactivate the relay, thereby deactivating the electrical load device.

In one embodiment, an improvement according to the invention is incorporated into an appliance of the type having at least one electrical load device operable from first and second conductors connected to a power source by way of a relay. The relay is operable from a control means, and a ground fault interrupter is provided that senses current flow in the first and second conductors and interrupts current to the electrical load device when current flow between the first and second conductors is not balanced. The improvement provides for the ground fault interrupter to send a signal indicative of current balance between the first and second conductors directly to the relay that operates the electrical load device, whereby the relay is automatically deactivated when the signal indicates a current imbalance detected by the ground fault interrupter.

In one aspect an AND gate is disposed between the ground fault interrupter and the relay and between the control means and the relay, wherein the AND gate must receive signals from both the ground fault interrupter and the control means in order to operate the relay, and a break in signal from either the ground fault interrupter or the control means will deactivate the relay. Preferably, the control means is a microprocessor. Also, the ground fault interrupter can send a signal to the control means, so that the control means will be deactivated when the ground fault interrupter senses a current imbalance between the first and second conductors. Preferably, the relay is closed only when current is flowing to the electrical load device.

In another aspect of the invention, means are provided to protect the circuit or an appliance against reverse polarity of current flowing through the first and second conductors. Typically, the second conductor is neutral. The protection means can include a relay to enable breaking current flow through the second conductor in the event of reverse polarity. Alternately, protection is provided where the relay is a double throw, double pole type. Moreover, the protection means can be a flow detector circuit to determine the direction of current flow in one of the first and second conductors. In this case, the first conductor is typically a hot wire conductor and the flow detector circuit determines the direction of current flow in the first conductor.

The flow detector circuit can generate a polarity signal to the microprocessor when reverse polarity is detected in the current flow and the microprocessor can stop current flow upon receipt of the polarity signal. Preferably, the flow detector circuit will comprise a digital comparator that will compare voltage inputs from the first and second conductors, and generate a signal indicative of current flow.

In this aspect, an AND gate can be provided between the ground fault interrupter and the relay and between the flow detector circuit and the relay, wherein the AND gate must receive signals from both the ground fault interrupter and the flow detector circuit in order to operate the relay, and any break in signal from either the ground fault interrupter or the flow detector circuit will deactivate the relay. This way, the flow detector circuit can operate independently from the microprocessor.

In a typical application, the appliance can be a dishwasher and the electrical load devices in the dishwasher can be a vent fan, a motor, and a resistance heater.

DETAILED DESCRIPTION

Figure 1:
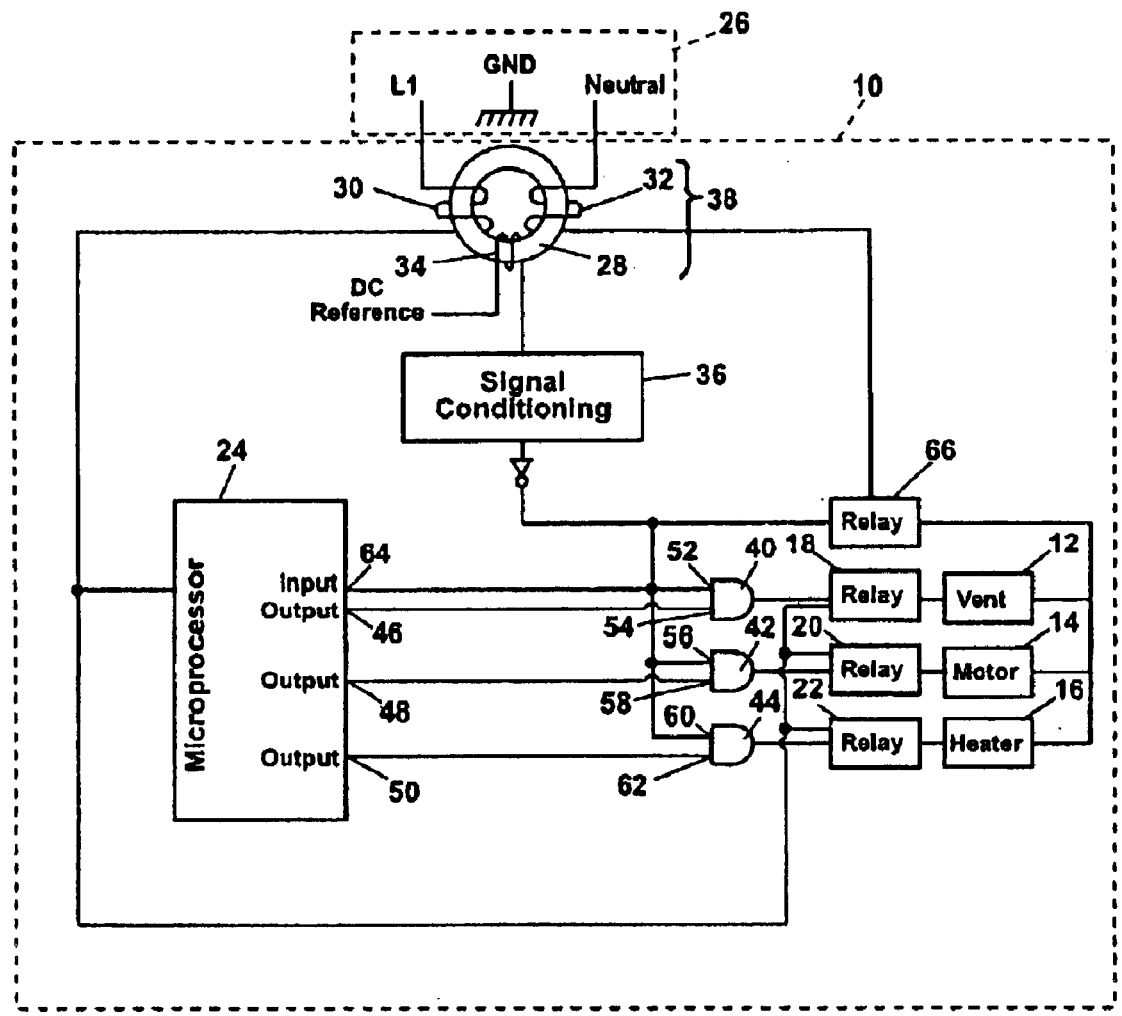
FIG. 1 is block schematic diagram of a circuit according to the invention in a first embodiment for a dishwasher.

Referring first to FIG. 1, a dishwasher generally designated 10 comprises several electrical load devices including a vent fan 12, a drive motor 14, and a resistance heater 16. Each of the vent fan 12, the drive motor 14, and the resistance heater 16 is driven by a relay 18, 20, and 22, respectively. As is typical in many dishwashers, the relays 18, 20, and 22 are controlled by a control means, which in many applications is a microprocessor 24.

Current is supplied to the microprocessor 24 and to the relays 18, 20, and 22 through conductor L1 and returned through neutral N from a standard single phase, two wire power source 26, with a connection to ground. Conductors L1 and N pass through a core 28, and are preferably inductively wound around the core 28 at primary windings 30 and 32, respectively. The secondary winding 34 senses any imbalance in the current running through conductors L1 and N and sends a signal through a signal conditioner 36 to the relays 18, 20, and 22. The core 28, the primary windings 30, 32, and the secondary winding 34 comprise a fairly conventional GFI sensor 38. Before any signal from the GFI sensor 38 reaches one of the relays, however, it is sent to one of three AND gates 40, 42, and 44, corresponding to the relays 18, 20, and 22 respectively. The first AND gate 40 thus stands between the vent relay 18, on the one hand, and the GFI sensor 38 and the microprocessor 34 on the other hand. Similarly, the AND gate 42 stands in front of the motor drive relay 20, and the AND gate 44 stands in front of the resistance heater relay 22.

The microprocessor 24 has three outputs 46, 48, and 50 for controlling operation of the relays 18, 20, and 22, respectively. The GFI sensor 38 is connected to a first input 52 on the vent relay AND gate 40 and the microprocessor output 46 is connected to a second input 54 on the vent relay AND gate 40. Similarly, the GFI sensor 38 is connected to a first input 56 on the motor relay AND gate 42 and the microprocessor output 48 is connected to a second input 58 on the motor relay AND gate 42. Also, the GFI sensor 38 is connected to a first input 60 on the heater relay AND gate 44 and the microprocessor output 50 is connected to a second input 62 on the heater relay AND gate 44.

It is to be noted that each of the relays 18, 20, and 22 is normally open in that the load device connected to the respective relay, namely the fan 12, the drive motor 14, and the resistance heater 16 will not operate until the respective relay is closed thereby delivering current. Note further that a relay will not close until it receives a signal from the corresponding AND gate. Each AND gate 40, 42, and 44 waits for signals from both the GFI sensor 38 and the microprocessor 24 and will close the connection only when both signals are active. A break in either signal will result in opening the corresponding relay.

Thus, for example, when the microprocessor 24 is set to instruct the drive motor 14 to operate, it sends a signal from output 48 to the input 58 at the motor relay AND gate 42. If there is no imbalance in current between conductors L1 and N, the GFI sensor 38 will send an active signal to the input 56 at the motor relay AND gate 42. Only when the motor relay AND gate 42 receives both signals at inputs 56 and 58 does it close the connection in the motor relay 20 thus completing the circuit to activate or energize the motor 14. If any current imbalance occurs between the conductors L1 and N, as for example if there were a ground fault between the conductor L1 and ground, a break in the signal from the GFI sensor 38 would result in a loss of signal at input 56 of the motor relay AND gate 42. Without two active signals at the inputs 56, 58, the motor relay AND gate 42 would cause the motor relay 20 to open, breaking the circuit, and shutting down the motor 14. Simultaneously, a sensing signal from the GFI sensor 38 is fed back to the microprocessor 24 at an input 64, instructing the microprocessor 24 to shutdown in the event of a current imbalance. Shutting down the microprocessor 24 prevents damage to the dishwasher 10 in the event of an intermittent failure that would cycle any one or all of the relays 18, 20 and 22 on and off. This feedback to the microprocessor 24 can also enable communication to the user of the nature of a failure by way of a visual or aural display.

Additional relay 66 is also provided in the circuit to enable switching of the neutral line N. This is necessary to protect the user in the event that the dishwasher 10 carries a reverse polarity, such as if it were reverse wired. The breaking of the neutral line N can also be accomplished by using double throw, double pole relays 18, 20, and 22, in which case the need for a fourth relay 66 is obviated.

It will be apparent that the circuit illustrated in FIG. 1 provides two important differences from a standard GFI circuit. First, the signal from the GFI sensor 38 is sent directly to the relays 18, 20, and 22 that operate the load devices 12, 14, and 16 in the dishwasher 10 rather than to a separate control circuit. Consequently the relays 18, 20, and 22 that operate the dishwasher 10 are "tested" every time the dishwasher is used, thereby automatically checking for contact welding. If welding does occur, the dishwasher 10 will malfunction and must be repaired. Second, the relay contacts used in the dishwasher 10 are normally open as opposed to the normally closed type used in conventional GFI's. This further reduces the opportunity for contact welding because the circuits are open when the dishwasher is off thereby making it highly unlikely for welding to occur during an electrical storm or other electrical surge.

Figure 2:
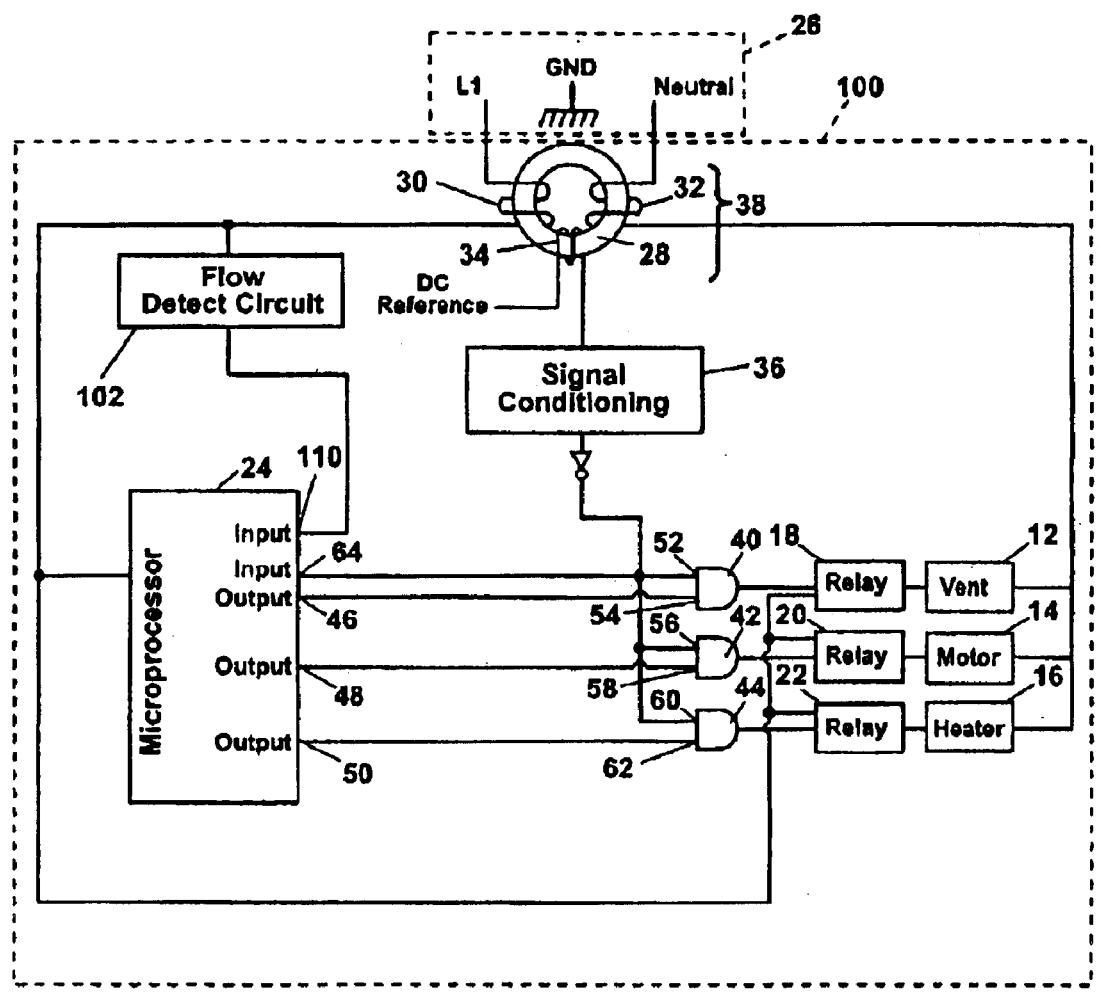
FIG. 2 is a block schematic diagram of a circuit according to the invention in a second embodiment for a dishwasher.
Figure 3:
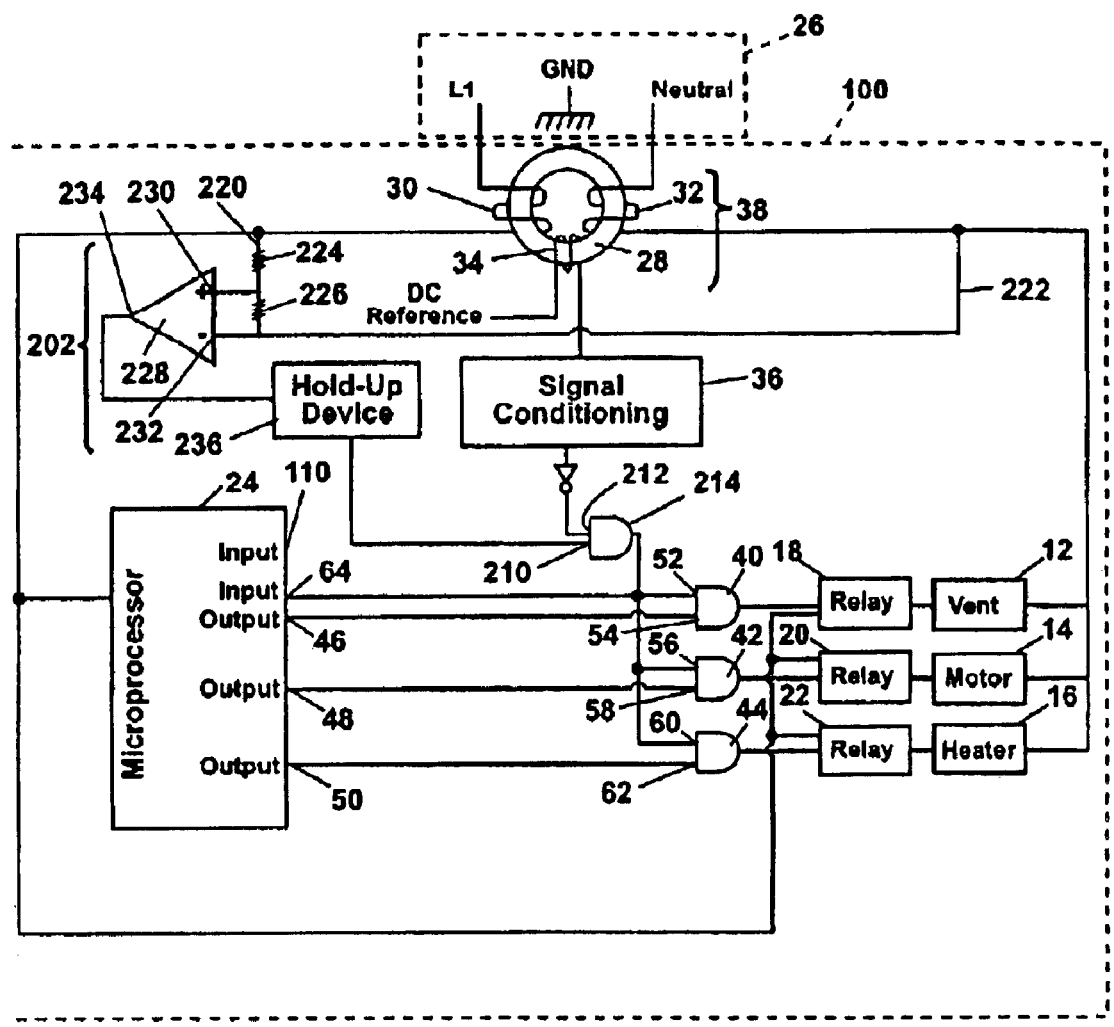
FIG. 3 is a block schematic diagram of a circuit according to the invention in a third embodiment for a dishwasher.

Turning now to FIGS. 2 and 3, alternate embodiments of a dishwasher incorporating the circuit according to the invention are shown. Here, parts common to those of FIG. 1 are shown with like numerals. In FIG. 2, it can be seen that instead of having a relay 66 to break current in the neutral conductor N in the event of reverse polarity, a flow detector circuit 102 is provided to sense the flow direction of current in the hot wire conductor L1. The signal is monitored at an input 110 by the microprocessor 24. As long as it receives a signal at input 110, the microprocessor 24 allows the dishwasher 100 to function normally. Should polarity in the hot wire conductor L1 be reversed, as for example in the event the dishwasher 100 is reverse wired, the microprocessor 24 will not permit the dishwasher 100 to operate because it will not receive a signal at input 110.

It will be apparent that the embodiment of FIG. 2 depends upon the microprocessor 24 to determine whether a reverse polarity situation exists. It may be advisable in certain applications to separate the safety functions of the invention from those of the main microprocessor 24. The embodiment of FIG. 3 illustrates use of a flow detector circuit not dependent upon a microprocessor, and also illustrates in greater detail an exemplary flow detector circuit. In FIG. 3, parts common to those of FIGS. 1 and 2 are shown with like numerals. Here, the dishwasher 200 has a flow detector circuit 202 that senses flow direction of current in the hot wire conductor L1. It does so by determining whether the voltage of the hot wire conductor L1 is greater than the neutral conductor N; when it is, it will consider that reverse polarity does not exist and permit operation. If not, then the device is rendered inoperable.

In the flow detector circuit 202, the hot wire conductor L1 and neutral conductor N are both tapped at conductors 220, 222, and the voltage of each conductor is scaled down by resistors 224, 226. Reduced voltages feed into a digital comparator 228, the main conductor 220 to the "high" input 230 of the comparator and the neutral conductor to the "low" input 232 of the comparator. The comparator 228 by design will not accept a negative input. Diodes, if needed, can be employed to ensure no negative input to the comparator in a properly wired appliance, a reduced amplitude AC signal with frequency equivalent to the dishwasher's incoming power is sent from the main conductor 220 to the "high" input 230 on the comparator 228. The comparator 228 will not accept a negative input, it will observe a positive half-wave form with gaps between the half-waves equal to half the frequency of the AC input power. This signal to the neutral signal on the "low" input 232, the comparator 228 outputs an "on" signal every time it senses the "high" input is above the "low" input. results in an on-off digital pulse output at 234 of the same frequency of the AC input power. If the appliance wiring is reversed, the comparator would still sense a positive half-wave form, but in this case, on it's "low" input with a neutral signal on its "high" input. The "high" input would never be higher than the "low" input, the resulting output at 234 would be null.

The signal 234 from comparator 228 is routed to a hold-up device 236 that converts the pulse signal to a steady signal. The hold-up device 236 closes a contact when an "on" signal is received and the contact closed for a period equal to at least half of the AC signal so that the contact does not open when the signal momentarily pulses "off". Way, a steady signal is generated. Switching delay is kept reasonably short so as not to delay a response to a change in the comparator output 234, but long enough so that the normal pulsing of the comparator output does not generate an unstable signal. There are numerous ways of accomplishing the functions of the hold-up device. Any circuit that will keep a switch closed between wave pulses, but open if loss of signal occurs for two or more cycles will work, such as an RC network, a Schmidt trigger, etc.

The signal from the hold-up device 236 goes to an input 210 at an AND gate 214. The signal from the GFI sensor 38 to the signal conditioner 36 goes to another input 212 on the AND gate 214. If both signals are present, the AND gate 214 forwards a signal to the respective AND gates 40, 42, and 44 for operation as described above. Thus, the dishwasher 200 is permitted to operate to only when there is no current imbalance sensed by the GFI sensor 38 and when there is no reverse polarity sensed by the flow detector circuit 202.

It will be appreciated that the invention just described is not limited to application in a dishwasher. It has application in any type of appliance having an electrical load device operable from a normally open relay. Moreover, even if the relay is not a normally open type, providing a gate switch in front of the relay provides a level of control that can accommodate the benefits of a GFI sensor. Also, the invention has applicability in an appliance that is not controlled by a microprocessor. For example, a control means can include a manual switch for operating a motor. If the switch is capable of receiving feedback from the GFI sensor 38 to render it inoperable when a current imbalance is detected, the appliance as well as the user is protected.

While the invention has been specifically described in connection with certain specific embodiments thereof, It is to be understood that this is by way of illustration and not of limitation, and the scope of the appended claims should be construed as broadly as the prior art will permit.

What is claimed is:

1. In an appliance of the type having at least one electrical load device operable from first and second conductors connected to a power source by way of a relay, said relay being operable from a control means, and a ground fault interrupter that senses current flow in the first and second conductors and interrupts current to the electrical load device when current flow between the first and second conductors is not balanced, the improvement wherein:

the ground fault interrupter sends a signal indicative of current balance between the first and second conductors to the relay that operates the electrical load device, whereby the relay is automatically deactivated when the signal indicates a current imbalance detected by the ground fault interrupter.

2. The improvement of claim 1 further comprising an AND gate between the ground fault interrupter and the relay and between the control means and the relay, wherein the AND gate must receive signals from both the ground fault interrupter and the control means in order to operate the relay, and a break in signal from either the ground fault interrupter or the control means will deactivate the relay.

3. The improvement of claim 2 wherein the control means is a microprocessor.

4. The improvement of claim 2 wherein the ground fault interrupter also sends a signal to the control means, and wherein the control means will be deactivated when the ground fault interrupter senses a current imbalance between the first and second conductors.

5. The improvement of claim 1 wherein the relay is closed only when current is flowing to the electrical load device.

6. The improvement of claim 1 further comprising means to protect against reverse polarity of current flowing through the first and second conductors.

7. The improvement of claim 6 wherein the second conductor is neutral and the protection means comprises a relay to enable breaking current flow through the second conductor in the event of reverse polarity.

8. The improvement of claim 6 wherein the protection means comprises the relay being a double throw, double pole type.

9. The improvement of claim 6 wherein the protection means comprises a flow detector circuit to determine the direction of current flow in one of the first and second conductors.

10. The improvement of claim 9 wherein the first conductor is a hot wire conductor and the flow detection circuit determines the direction of current flow in the first conductor.

11. The improvement of claim 9 wherein the control means is a microprocessor and the flow detection circuit generates a polarity signal to the microprocessor when reverse polarity is detected in the current flow whereby the microprocessor can stop current flow upon receipt of the polarity signal.

12. The improvement of claim 9 wherein the flow detector circuit comprises a digital comparator to provide a signal representative of current polarity to the control means.

13. The improvement of claim 9 further comprising an AND gate between the ground fault interrupter and the relay and between the flow detection circuit and the relay, wherein the AND gate must receive signals from both the ground fault interrupter and the flow detection circuit in order to operate the relay, and any break in signal from either the ground fault interrupter or the flow detection circuit will deactivate the relay.

14. The improvement of claim 13 wherein the flow detector circuit comprises a digital comparator that generates a signal representative of current polarity to the AND gate.

15. The improvement of claim 1 wherein the appliance is a dishwasher.

16. The improvement of claim 15 wherein the electrical load devices in the dishwasher comprise at least one of a vent fan, a motor, and a resistance heater.

17. A protective circuit for an electrical load device operable from first and second conductors connected to a power source by way of a relay, said relay being operable from a control means, the protective circuit comprising:

a ground fault interrupter capable of sensing any imbalance in current flowing through the first and second conductors and generating a signal indicative of that imbalance, wherein a signal indicative of current imbalance is sent to the relay, so that the relay deactivates the electrical load device upon receipt of the signal.

18. The protective circuit of claim 17 wherein the control means monitors the signal from the ground fault interrupter and deactivates itself when a signal indicative of current imbalance is received.

19. The protective circuit of claim 17 further comprising an AND gate between the ground fault interrupter and the relay and between the control means and the relay, wherein the AND gate must receive signals from both the ground fault interrupter and the control means for the relay to be activated, and a break in signal from either the ground fault interrupter or the control means will deactivate the relay, thereby deactivating the electrical load device.

* * * * *